(12) United States Patent
Sabbah

(10) Patent No.: US 10,043,218 B1
(45) Date of Patent: Aug. 7, 2018

(54) SYSTEM AND METHOD FOR A WEB-BASED INSURANCE COMMUNICATION PLATFORM

(71) Applicant: Basil M. Sabbah, Denver, CO (US)

(72) Inventor: Basil M. Sabbah, Denver, CO (US)

( * ) Notice: Subject to any disclaimer, the term of this patent is extended or adjusted under 35 U.S.C. 154(b) by 547 days.

(21) Appl. No.: 14/830,396

(22) Filed: Aug. 19, 2015

(51) Int. Cl.
*G06Q 40/08* (2012.01)
*G06Q 40/00* (2012.01)

(52) U.S. Cl.
CPC .............. *G06Q 40/08* (2013.01); *G06Q 40/00* (2013.01)

(58) Field of Classification Search
CPC ................................ G06Q 40/08; G06Q 40/00
See application file for complete search history.

(56) References Cited

U.S. PATENT DOCUMENTS

| | | | |
|---|---|---|---|
| 7,664,690 B2 * | 2/2010 | Dirnberger | G06Q 40/00 705/35 |
| 8,027,850 B1 * | 9/2011 | Pietrzak | G06Q 40/08 705/4 |
| 2002/0194033 A1 | 12/2002 | Huff | |
| 2007/0168382 A1 | 7/2007 | Tillberg et al. | |
| 2009/0037228 A1 | 2/2009 | Engel | |
| 2011/0258195 A1 | 10/2011 | Welling et al. | |
| 2012/0123891 A1 | 5/2012 | Patel | |
| 2012/0284058 A1 | 11/2012 | Varanasi et al. | |
| 2013/0204645 A1 | 8/2013 | Lehman et al. | |
| 2013/0238368 A1 | 9/2013 | Willis et al. | |
| 2014/0142987 A1 | 5/2014 | Misch et al. | |
| 2014/0195891 A1 | 7/2014 | Venkata Radha Krishna Rao et al. | |
| 2015/0066543 A1 | 3/2015 | Dubens | |

FOREIGN PATENT DOCUMENTS

WO    WO 2001/011517 A1    2/2001

OTHER PUBLICATIONS

Birny Birnbaum, Overview of Lender-Place Insurance Products, markets and Issues, Jun. 13, 2013, Birny Birnbaum Consulting, Inc ., web edition, 1-19 (Year: 2013).*

* cited by examiner

*Primary Examiner* — I Jung Liu
(74) *Attorney, Agent, or Firm* — Hanrahan Law Firm, P.A.; Benjamin M. Hanrahan

(57) ABSTRACT

A system and method for providing a network-based service quotation communication platform through which potential buyers and potential sellers or agents may be connected to one another is provided herein. Particularly, in certain embodiments, the buyer may upload a photograph, image or other digital file taken from an existing insurance policy, electric or energy bill, phone bill, cable bill, internet service provider bill, etc. Upon receipt of the image, limited lead information, such as the buyer's name and approximate policy vale, is provided to one or more sellers or insurance agents. If a seller or agent would like to view more detailed information pertaining to the request, or otherwise submit a bid or quote, then the seller or agent must purchase the lead with money or credits. Once purchased, the seller or agent may submit a bid, provide a quote or communicate certain proposals to the buyer.

6 Claims, 15 Drawing Sheets

Your policy effective date is March 19, 2015   400
AUTO POLICY DECLARATION

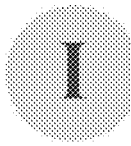 GREAT STATE INSURANCE COMPANY

Total Premium for the Policy Period

Please review your insured vehicles
and verify their VINs are correct

| Vehicles Covered  402 | VIN | Premium |
|---|---|---|
| 2006 Toyota Highlander | A761230222 | $352.44 |
| 2005 Acura TL ← 402 | 295A321393 | $297.16 |
| Uninsured Motorist Insurance | | $82.20 |

Total:
If you pay in installments   404 →   $731.80
If you pay in full   $667.22

Discounts (included in your total premium)

| Safe Driving: | $59.03 | Multiple Policy: | $36.04 |
| Responsible Payer: | $49.68 | Early Signing: | $80.57 |
| Homeowner: | $56.23 | Passive Restraint: | $12.67 |
| Antilock Brakes: | $37.99 | Electronic Stability Control: | $79.02 |

Total Discounts:   $410.23

Policy Discounts   $280.55

| Safe Driving: | $59.03 | Early Signing: | $80.57 |
| Multiple Policy: | $36.04 | Homeowner: | $56.23 |
| Responsible Payer: | $48.68 | | |

2006 Toyota Highlander Discounts   $61.85

Passive Restraint:  $6.29   Antilock Brakes:  $18.20
Electronic Stability
Control:  $37.36

2005 Acura TL Discounts   $67.83

Passive Restraint:  $6.38   Antilock Brakes:  $19.79
Electronic Stability
Control:  $41.66

Summary

Named Insured(s):

Joe Smith
1235 Ash Street
Denver, Colorado 80202

Policy Number:
832123

Policy Period:
Beginning March 19, 2015
Through Sept. 19, 2015 at
12:01am standard time Your Agent is:
Michael Johnson
324 Main Street
Denver, Colorado 80202
303-123-4568

← 406

Listed Driver(s):
Joe Smith
Ann Smith

Excluded Driver(s):
None

FIG. 4A1

AUTO POLICY DECLARATION

Coverage Details for 2006 Toyota Highlander

| Coverage | Limits | Deductible | Premium |
|---|---|---|---|
| Automobile Liability Insurance | | Not Applicable | $200.86 |
| Bodily Injury | $100,000 each person $300,000 each accident | | |
| Property Damage | $200,000 each accident | | |
| Auto Collision | Actual Cash Value | $500 | $94.09 |
| Auto Comprehensive Insurance | Actual Cash Value | $250 | $39.57 |
| Property Damage Caused By Uninsured Motorist Coverage | | Not Purchased | |
| Rental Reimbursement | | Not Purchased | |
| Towing and Labor Costs | | Not Purchased | |
| Auto Medical Payments | $5,000 each person | Not Applicable | $17.92 |
| Sound System | | Not Purchased | |
| Tape | | Not Purchased | |
| Total Premium for 2006 Toyota Highlander | | | $352.44 |

Coverage Details for 2005 Acura TL

| Coverage | Limits | Deductible | Premium |
|---|---|---|---|
| Automobile Liability Insurance | | Not Applicable | $110.73 |
| Bodily Injury | $100,000 each person $300,000 each accident | | |
| Property Damage | $200,000 each accident | | |
| Auto Collision | Actual Cash Value | $500 | $116.83 |
| Auto Comprehensive Insurance | Actual Cash Value | $250 | $51.44 |
| Property Damage Caused By Uninsured Motorist Coverage | | Not Purchased | |
| Rental Reimbursement | | Not Purchased | |
| Towing and Labor Costs | | Not Purchased | |
| Auto Medical Payments | $5,000 each person | Not Applicable | $18.16 |
| Sound System | | Not Purchased | |
| Tape | | Not Purchased | |
| Total Premium for 2006 Toyota Highlander | | | $297.16 |

FIG. 4A2

Your policy effective date is March 19, 2015 — 400

HOUSE & HOME
POLICY DECLARATION

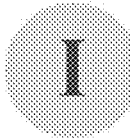 GREAT STATE INSURANCE COMPANY

| Total Premium for the Policy Period | |
|---|---|
| Premium for the property insured | |
| Total: 404 ⟶ | $1,896.13 |

Discounts (included in your total premium)

| | | | |
|---|---|---|---|
| Protective Device: | $54.38 | Multiple Policy: | $257.38 |
| Claim Free: | $296.04 | Early Signing: | $55.10 |
| Home Buyer: | $0.58 | Welcome: | $93.82 |
| Loyalty: | $93.82 | Responsible Payment: | $611.07 |

| Total Discounts: 406 ⟶ | $1,462.19 |
|---|---|

Insured Property Details

Location of Property Insured: 1235 Ash St.
Denver, Co. 80202
Dwelling Style:
Built in 1905; 1 family; 2645 sq. ft.; 1 story
Foundation: 100% basement (50% finished)
Attached Structure: One 2-car attached garage
Interior Details:
One basic kitchen          One basic half bath
Two basic full baths      One single fireplace
Exterior Wall Type: 100% solid brick
Heating and Cooling: Gas heating, 100%
Additional Details: Interior wall height > 10 ft. 100%
Fire Protection Details:
Fire Dept. Subscription-No; 1 mile to Fire Dept.

Summary

Named Insured(s):

Joe Smith
1235 Ash Street
Denver, Colorado 80202

Policy Number:
832124

Policy Period:
Beginning March 19, 2015
Through Sept. 19, 2015 at
12:01am standard time Your Agent is:
Michael Johnson
324 Main Street
Denver, Colorado 80202
303-123-4568

HOUSE & HOME POLICY DECLARATION

Insured Property Details (continued)

Roof Surface Material Type:
Composition: 100% asphalt / fiberglass shingle
Roof Details:
Predominant roof type: composition
Age of roof: 6 years
Roof geometry: gable
Mortgagee:
Quick Loans Inc.
Amelia, Ohio 45102
Loan Number: 1023308
Additional Interested Party:
None

408

Coverage Details (for the property insured)

| Coverage | Limits of Liability | Deductible |
|---|---|---|
| Dwelling Protection | $495,095 | $1,000 Windstorm & Hail $1,000 all other perils |
| Other Structured Protection | $49,510 | $1,000 Windstorm & Hail $1,000 all other perils |
| Personal Property Protection | $371,322 | $1,000 Windstorm & Hail $1,000 all other perils |
| Additional Living Expenses | Up to 24 months not to exceed $123,774 | |
| Family Liability Protection | $300,000 each occurrence | |
| Guest Medical Protection | $1,000 each person | |
| Roof Surfaces Extended Coverage | included | |
| Water Back-up | Not Purchased | |
| Building Codes | Not Purchased | |
| Building Structure Reimbursement Extended Limits | Not Purchased | |
| Building Material Theft | Not Purchased | |
| Dwelling in the Course Of Construction | Not Purchased | |
| Electronic Data Recovery | Not Purchased | |

FIG. 4B2

BUYER PROFILE ← 101

First Name:
[ Joe ]

Last Name:
[ Smith ]

E-Mail:
[ Joe.Smith@gmail.com ]

Zip Code:
[ 93012 ]

Password:
[ ****** ]

Confirm Password:
[ ****** ]

⎬ 103

Phone Number:
[ (111) 123-4567 ]

○ Please do not share my phone number with insurance brokers

○ Text me when insurance broker sends pricing ⎬ 105

○ I Agree with <u>Terms of Service</u>

○ I have been involved in an insurance claim in the last 12 months

○ I have received a moving violation in the last 12 months

⎬ 107

[ SUBMIT / GET OFFERS ]

FIG. 5A

SYSTEM AND METHOD FOR A WEB-BASED INSURANCE COMMUNICATION PLATFORM

FIELD OF THE INVENTION

The present invention is generally directed to a system and method for connecting insurance buyers with insurance agents or insurance sellers via a network-based insurance communication or quotation platform. Using the platform, the buyer(s) will upload or otherwise provide information relative to an existing or prior insurance policy as part of a request for an insurance quote or a request for proposal ("RFP"). Initially, limited information corresponding to the request is provided to registered sellers or agents, although further information may be purchased by the agent in order to submit a bid or quote or in order to unlock additional functionality of the system.

BACKGROUND OF THE INVENTION

Today, there are a number of websites and services that offer the ability to obtain quotes for automobile or home insurance policies. These websites are oftentimes operated by or on behalf of the particular insurance companies themselves, or by a third-party company that forwards the information to the particular insurance agencies. The process is often cumbersome and time consuming for a number of reasons.

For instance, the buyer is often required to manually input all of the information pertaining to the insurance request in order to receive a quote from the insurance agency. This is time consuming and prone to errors. Also, receiving multiple quotes from multiple different insurance agencies requires the potential buyer to input all of the information on each and every website, individually. Again, this is time consuming and prone to errors. Furthermore, once the information has been manually and individually inputted into the different websites, it requires a significant amount of time to manage the various and disparate communications from different sellers via traditional mail, email and phone.

Accordingly, there is a need for a system and method that vastly reduces the time and energy required for a potential buyer to submit a request for proposal or a request for a quote by allowing the buyer to upload an image of an existing or previous insurance policy using a mobile phone, tablet or computer. This will eliminate the need for the buyer to manually input each and every element or term requested in the policy. Rather, the proposed system and method can process the image and extract information that can be provided to potential sellers or insurance agents/brokers.

In addition, the proposed system and method will improve the quality and quantity of bids provided by insurance agents because of the perceived higher quality of buyer. Sellers or agents will be more motivated to bid on a new insurance policy for a potential buyer who has uploaded an existing or previous policy than a customer who has filled in an online form manually. Particularly, the data obtained from the policy photograph or digital file of the proposed system and method may be perceived as real data from a real policy.

Furthermore, the proposed invention may significantly improve the quality of communication between the buyer and seller, allowing for real-time messaging between the buyer and multiple sellers on a single platform. This will allow the buyer to avoid the need to manage multiple emails and phone calls from multiple sellers or agents.

SUMMARY OF THE INVENTION

As described herein, the various embodiments of the present invention are directed to a system and method for providing a network-based service quotation communication platform through which potential buyers and potential sellers or agents may be connected to one another. Particularly, in certain embodiments, the buyer may upload or otherwise provide information in connection with a request for proposal ("RFP") or request for a quotation relative to services such as an insurance policy (e.g., auto, home, motorcycle, renter's insurance, etc.), electric or energy bills, phone bill, cable bill, internet service provider bill, etc.

Specifically, in at least one embodiment, the potential buyer may already have an existing insurance policy or service, or previously had an insurance policy or other service agreement that is elapsed or expired, and is now seeking to obtain a new or updated policy and/or perhaps a policy that is more beneficial, comparable, or has different terms. Accordingly, the potential buyer may obtain an image, digital representation, or digital file of a current, existing or previous insurance policy and upload the file to the platform of the present invention. For instance, the buyer or potential buyer may take a photograph of the policy or a portion of the policy (e.g., one or more pages of a policy declaration sheet) via a mobile device (e.g., mobile phone or tablet) or via a laptop, desktop, webcam, or other camera. The image or photograph may be uploaded directly to the platform of the present invention for processing and/or subsequent delivery to an insurance agent.

More in particular, upon receipt of the RFP, including the digital file or image, at least initially, limited lead information according to the request and/or previous or existing policy provided to one or more sellers or insurance agents. If the seller(s) or agent(s) would like to view more detailed information pertaining to the request, or otherwise submit a bid, pricing, terms or a quote in response to the request, then, in at least one embodiment, the seller(s) or agent(s) must purchase the lead with money or credits. Once purchased, the seller(s) or agent(s) may submit a bid, provide a quote or communicate certain proposals to the buyer(s). Upon doing so, messaging capabilities may be unlocked or the buyer's contact information may be released to the seller(s) or agent(s), allowing for direct communication there between.

These and other objects, features and advantages of the present invention will become more apparent when the drawings as well as the detailed description are taken into consideration.

BRIEF DESCRIPTION OF THE DRAWINGS

FIG. 4A1 is a page from an exemplary automobile policy declaration sheet as provided herein.

FIG. 4A2 is another page from an exemplary automobile policy declaration sheet as provided herein.

FIG. 4B1 is a page from an exemplary house and home policy declaration sheet as provided herein.

FIG. 4B2 is another page from an exemplary house and home policy declaration sheet as provided herein.

FIG. 5A is an exemplary screenshot illustrating the buyer profile as disclosed in accordance with at least one embodiment of the present invention.

Like reference numerals refer to like parts throughout the several views of the drawings provided herein.

DETAILED DESCRIPTION OF THE INVENTION

Figure 1:
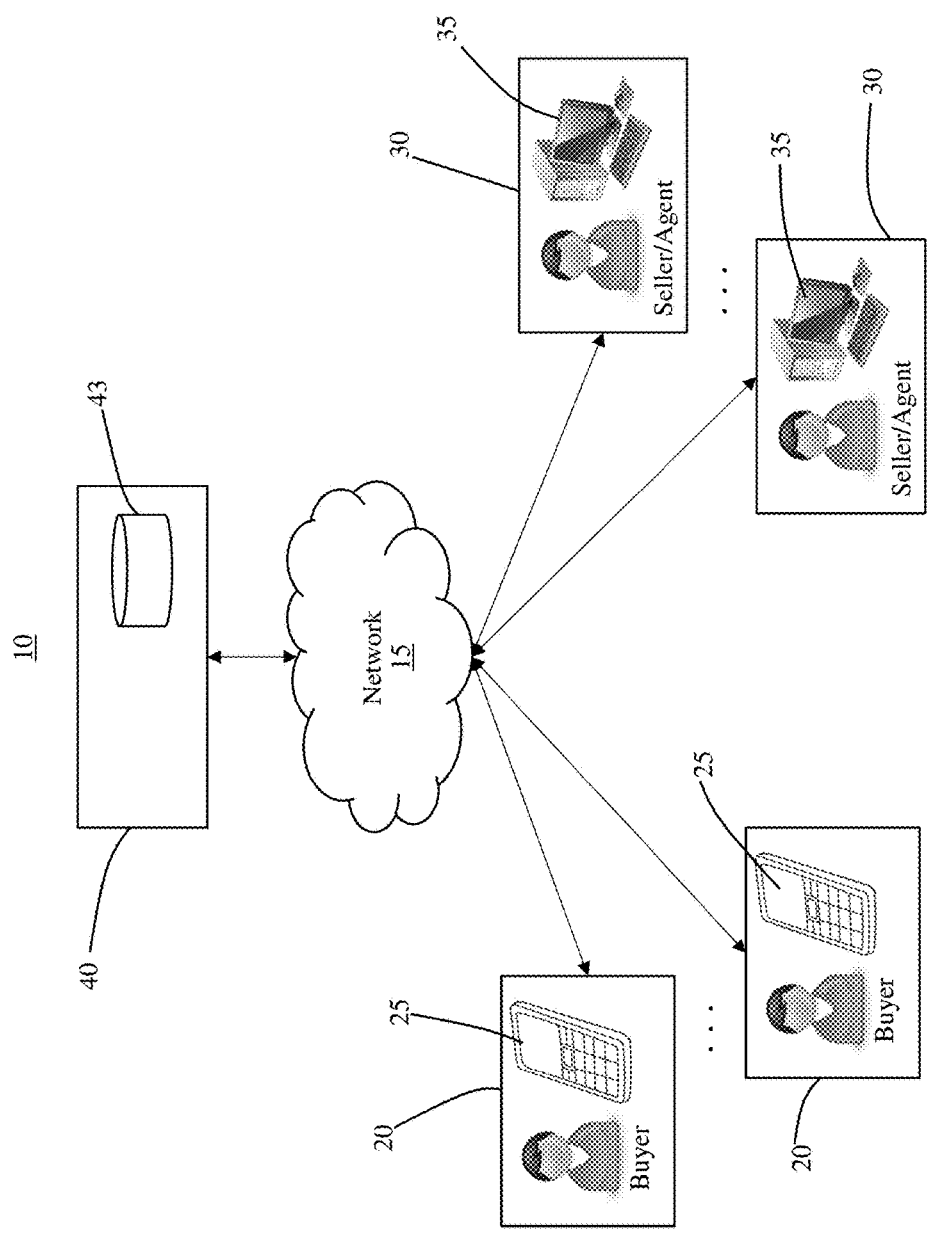
FIG. 1 is a schematic representation of the system as disclosed in accordance with at least one embodiment of the present invention.
Figure 3A:
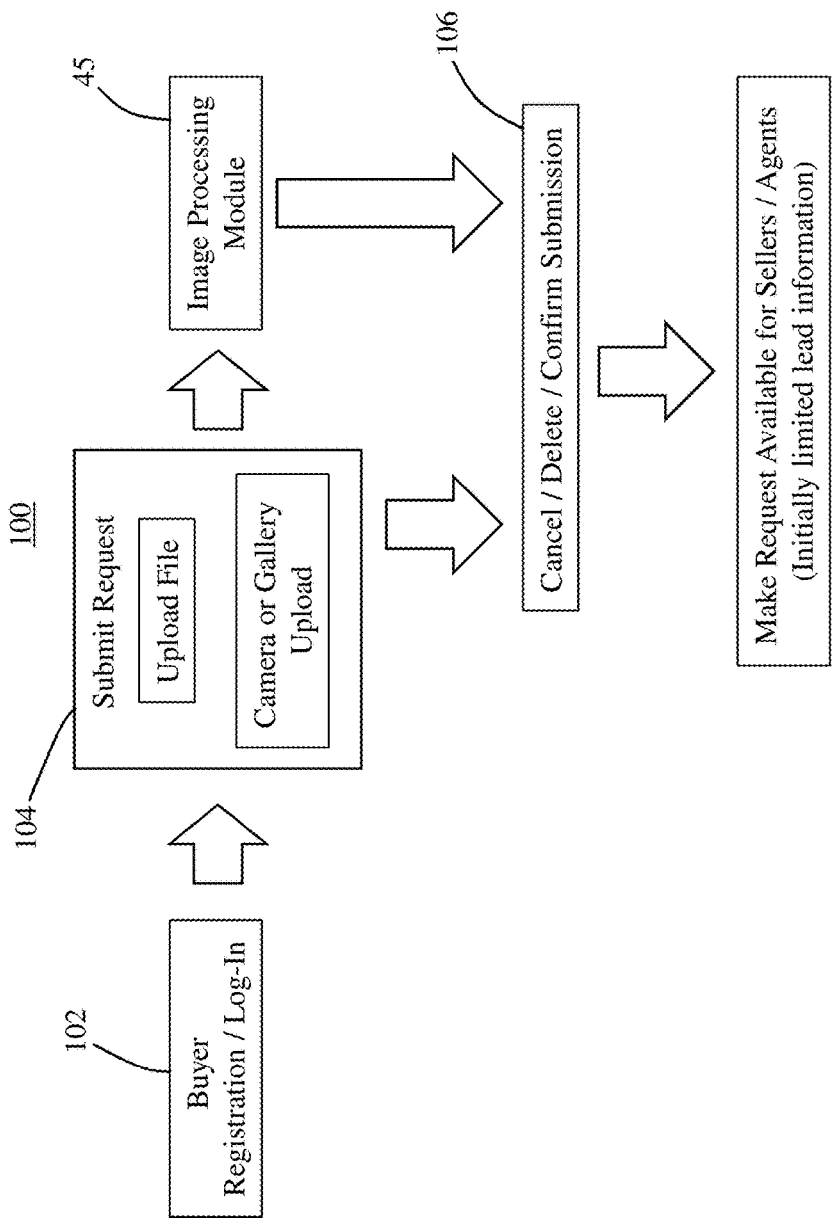
FIG. 3A is a high level buyer flow chart as disclosed in accordance with at least one embodiment of the present invention.
Figure 3B:
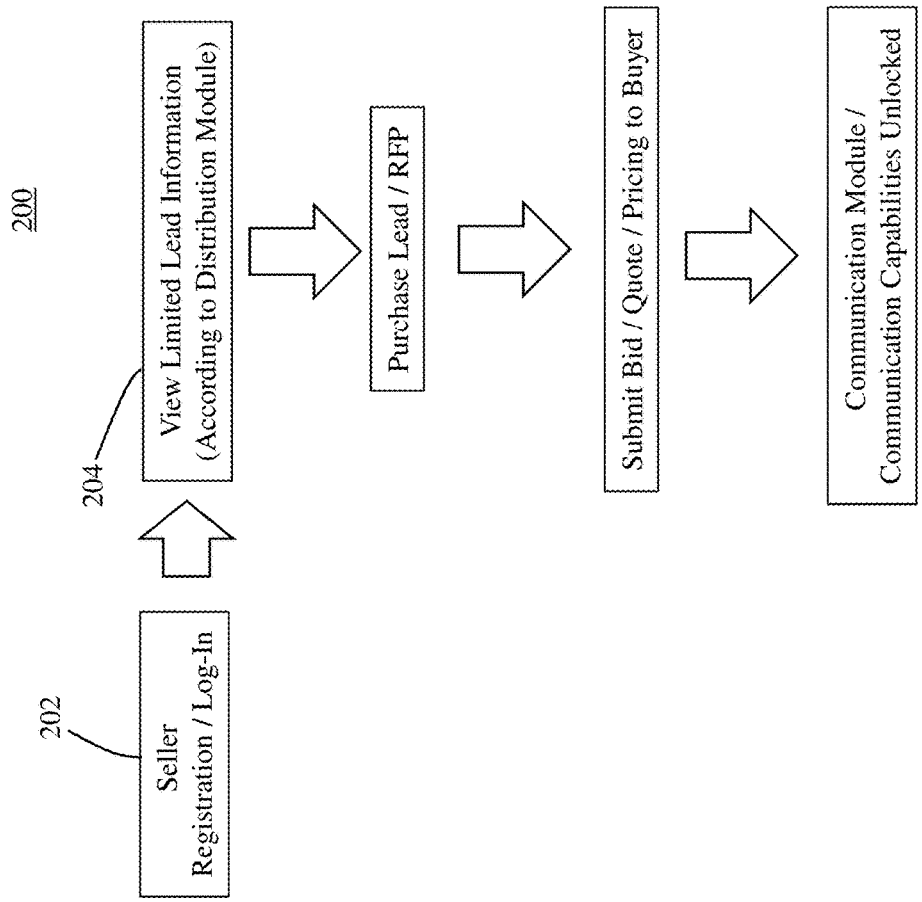
FIG. 3B is a high level seller flow chart as disclosed in accordance with at least one embodiment of the present invention.
Figure 3C:
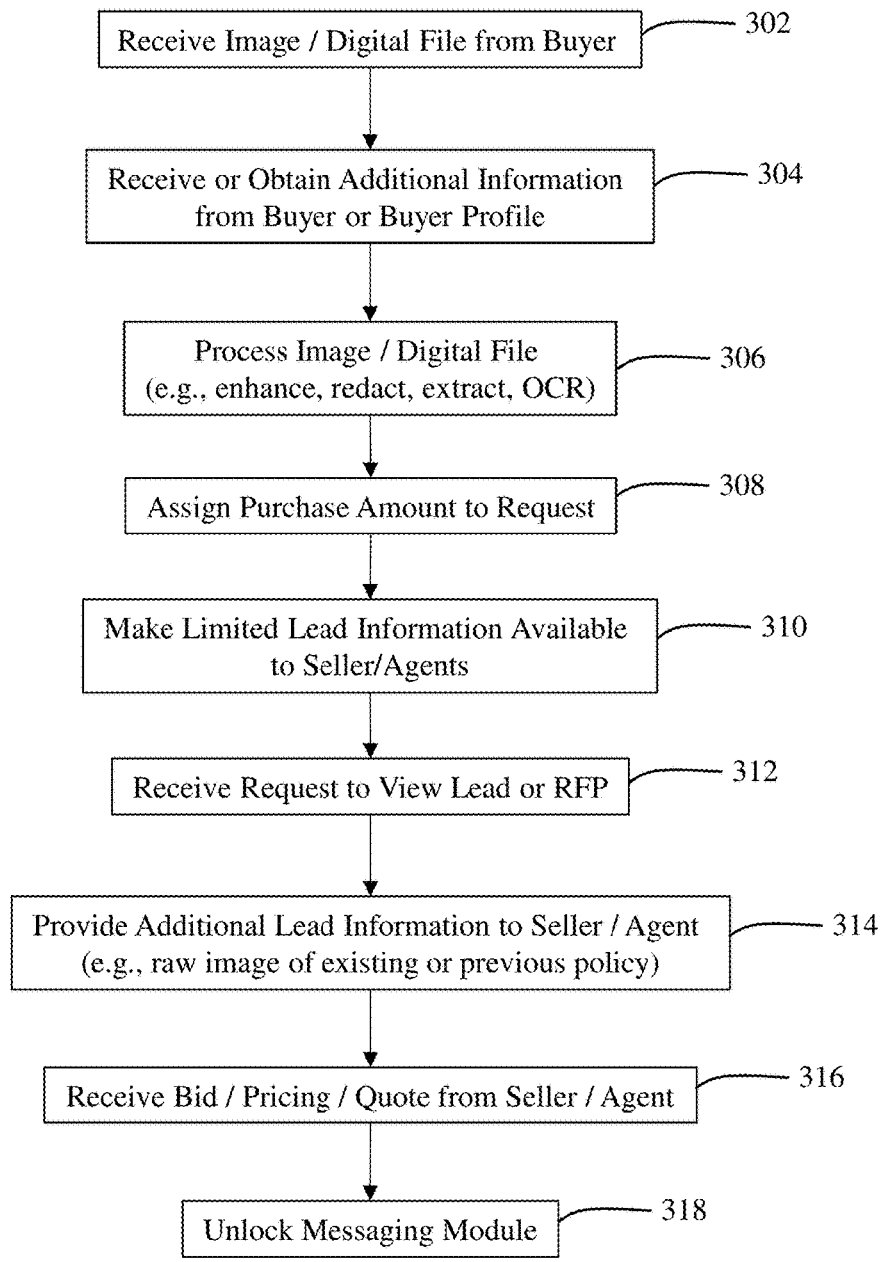
FIG. 3C is a high level flow chart of the method as disclosed in accordance with at least one embodiment of the present invention.

As shown in the accompanying drawings, and with particular reference to FIGS. 1 and 3C, the present invention is generally directed to a system 10 and a method 300 for providing a network-based service quotation communication platform through which potential buyers 20 and potential sellers or agents 30 may be connected to one another. Particularly, in certain embodiments of the present invention, the buyer 20 may upload or otherwise provide information in connection with the services in which he or she is interested in purchasing, such as, for example, automobile insurance, home insurance, renter's insurance, professional insurance, or other types of insurance policies or agreements. In addition, other embodiments of the present invention may include a request for proposal or quotation relative to other services, including, but not limited to electric or energy bills or agreements, phone bills or agreements, cable bills or agreements, internet service provider bills or agreements, etc.

Particularly, as described herein, in at least one embodiment, the potential buyer 20 may already have an existing insurance policy or previously had an insurance policy or other service agreement that is elapsed or expired, and is seeking to obtain a new or updated policy and/or perhaps a policy that is more beneficial, comparable, or has different terms. In such a case, the potential buyer 20 may obtain an image, digital representation, or digital file of a current, existing or previous insurance policy and upload the file to the platform 40 of the present invention. Upon receipt of the file, the file is processed and, at least initially, limited lead information is provided to one or more sellers or agents 30. If the seller(s) or agent(s) 30 would like to view more detailed information pertaining to the request, then, in at least one embodiment, the seller(s) or agent(s) 30 must purchase the lead with money or credits, as will be described herein. Once purchased, the seller(s) or agent(s) 30 may submit a bid, provide a quote or communicate certain proposals to the buyer(s) 20. Upon doing so, messaging capabilities may be unlocked or the buyer's 20 contact information may be released to the seller(s) or agent(s) 30 allowing for direct communication there between.

As used herein, a buyer 20 may be an individual or group of individuals seeking to obtain an insurance policy or other service agreement. The buyer 20, in many cases, may have an existing or previous insurance policy or service agreement and is willing to upload a digital image, photograph or file representing the previous or existing policy or agreement in order to receive comparable quotes or bids from a licensed broker, agent or seller. Accordingly, the buyer 20 is an individual who is a potential purchaser of an insurance policy or other service agreement within the scope of this invention. A seller or agent, as used herein, may include an insurance agent, broker or other individual or group of individuals who is licensed or employed to provide price quotations or price estimates on behalf of an insurance company, insurance agency, or other service company. An administrator, as used herein, is an individual or group of individuals who manages or is employed by the platform 40 or system and method of the present invention.

Specifically, referring to the schematic of FIG. 1, the system 10 of at least one embodiment comprises a management processing system or platform 40 disposed in a communicative relation with at least one computer or communication network 15, such as, for example, the World Wide Web, Internet, Intranet, Wide Area Network(s), Telecommunication Network(s) (e.g., 3G, 4G, LTE), etc. In this regard, the various users of the system 10, including, for instance, the potential buyer(s) 20 and the seller(s) or agent(s) 30 may register with the management processing system/platform (e.g., by creating a profile, providing log-in credentials, user name, password, etc.) for example by visiting a certain website (e.g., via a web browser), opening or executing an application (e.g., a mobile or desktop application), etc., via user or computer device, generally referenced as 25, 35. The seller account or profile may also comprise information such as the type of services provided (e.g., car/auto insurance, home insurance, motorcycle insurance, renter insurance, etc.), as well as an identification or description of the insurance agency with which the agent or seller is affiliated or represents. The seller's or agent's license number, office hours, location, address, office phone number, mobile phone number, agency website address, and profile picture may also be included. As should be apparent, the user devices 25, 35 of the various embodiments of the present invention may include virtually any computer based system, such as, but not limited to, a desktop computer, laptop computer, mobile computer, tablet, phone, media device, game device, PDA, etc.

Figure 2:
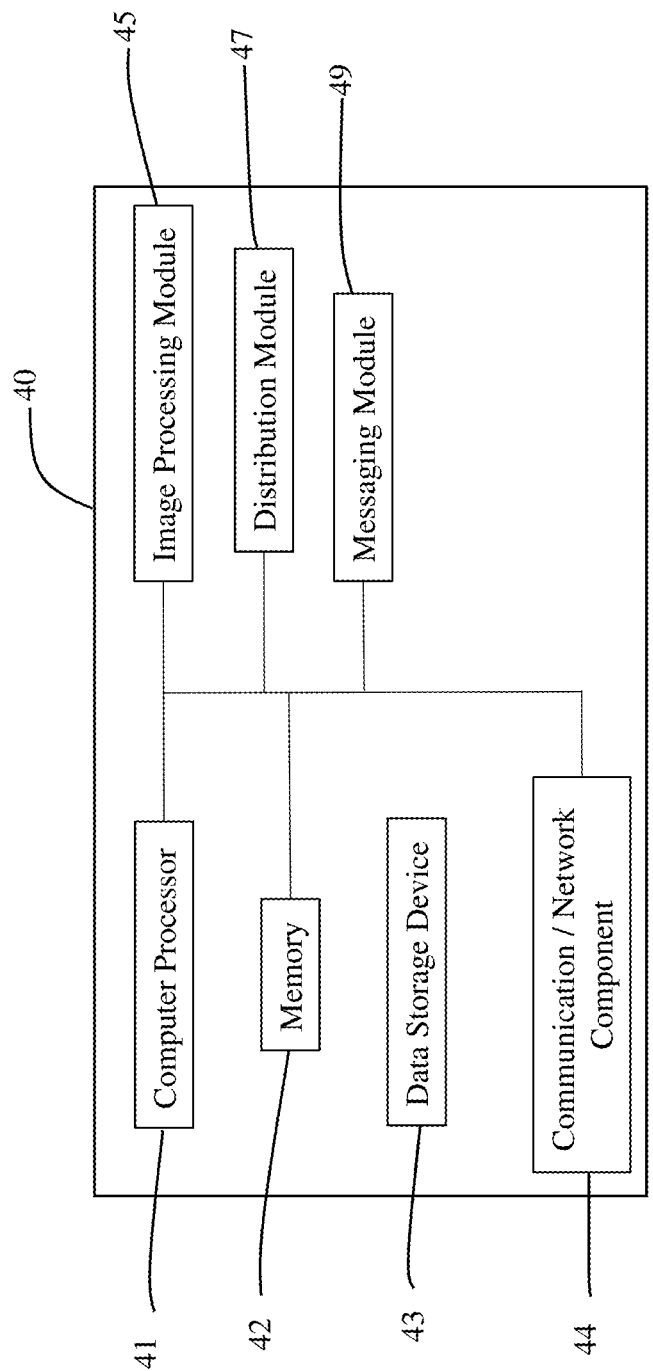
FIG. 2 is block diagram of the management processing system as disclosed in accordance with at least one embodiment of the present invention.

Referring now to the schematic representation of the management processing system/platform 40 as represented in FIG. 2, it is noted that the system/platform 40 of at least one embodiment includes, among other components and devices structured to facilitate implementation of the present invention in the intended manner, a computer processor 41, memory 42, a data storage device 43, and communication or network device(s) 44. Specifically, as used herein, the processor 41 of at least one embodiment may include any device or hardware cooperatively structured to execute or implement computer instructions, software, etc., including, for example, the various features and components as described in accordance with at least one embodiment of the present invention and configured to implement the method 300 herein. The data storage device 43, as used herein, may include a hard disk drive, CD/DVD, USB drive, solid state drive, virtual drive, could-based storage drive, or other types of volatile or non-volatile memory. The data storage device 43 may implement or otherwise include one or more databases, or other storage components, whether implemented in hardware, software, or both. Further, the memory device 42 as used herein, may include but is not limited to random access memory (RAM) or other like devices configured to implement the present invention in the intended manner, for example, by at least temporary storing and assisting with the execution of one or more applications, modules, or components capable of implementing the system 10 and method 300 described herein.

Moreover, the communication device 44 may include a network communication hardware/software component structured to facilitate communication between the various devices 25, 35 of the present invention. Accordingly, examples of the management processing system/platform 40 of the present invention may include a web or cloud-based computer or server, desktop computer, laptop computer, tablet, mobile or handheld computer, etc.

For example, in at least one embodiment, the potential buyer 20 or customer may access the management processing system 40, for instance, by accessing a webpage or web site via a web browser or by accessing a mobile application, desktop application, etc. In certain embodiments, the system/platform 40 may identify whether the buyer 20 is using a mobile or desktop device 25 in order to determine how the information (e.g., web site) should be displayed or formatted.

In any event, with reference to the high level buyer flow chart 100 of FIG. 3A, as shown at block 102 the buyer 20 may begin by creating an account or profile 101 (see example screenshot illustrated in FIG. 5A) or by logging into the system 40 via a previously created account. As an example, the buyer account or profile 101 may include certain personal information or contact information 103, such as the buyer's 20 name, email address, zip code or other location parameter (e.g., city, county, state, etc.) password, phone number, etc. Certain privacy or other communication terms 105 may be identified, selected or agreed upon, and additional information 107 that may be pertinent to the procurement of an insurance or other service agreement may also be included as part of the buyer account or profile 101. For exemplary purposes only, the additional profile information 107 may include questions/answers relative to whether the buyer 20 has been involved in an insurance claim in the past or within a certain amount of time (e.g., one year, five years, etc.), whether the buyer 20 has been involved in an accident in the past or within a certain amount of time, whether the buyer 20 has received a ticket or moving violation in the past or within a certain timeframe, etc.

Once the buyer 20 has logged into the system 40 or otherwise accessed the system 40, the buyer 20 may then decide to submit a request, as generally shown at block 104 in FIG. 3A. For example, the request, which in many embodiments is an insurance quotation request or a request for proposal (RFP), includes or comprises a media component or digital file, such as an image, photograph, scanned file, extracted file, pdf, png, jpeg, etc. that represents, includes or corresponds to information or details of an existing or prior service agreement or insurance policy. The request and the digital file thereof may also include details, descriptions or notes from the buyer 20 as to other or modified terms he or she is seeking in a new insurance policy or other service agreement.

For exemplary purposes only, the media component or digital file may include an image, file or document 400 representing or including an insurance policy declaration sheet, insurance card, or other sheet(s), pages, document(s) or file(s) which oftentimes includes detailed information or summary information about the insurance policy, including, for example, identification of items (e.g., vehicles, homes, property, etc.) covered 402, premium amount(s) 404, discounts applied 406, coverage details 408 (e.g., policy or coverage limits, deductible amount(s), and premium and premium amount(s)), policy identification numbers or accounts, effective date(s), identification of the insured, identification of an insurance agent and/or agency, etc. FIGS. 4A1 and 4A2 illustrate exemplary pages of an automobile insurance policy declaration sheet, and FIGS. 4B1 and 4B2 illustrate exemplary pages of a home insurance policy declaration sheet. FIGS. 4A1 through 4B2 are illustrative in nature only and should not be deemed limiting in any manner. For instance, within the full spirit and scope of the present invention, other sheets, pages, documents, files, etc. can be used as the digital file or medial element of the request provided by the buyer.

Figure 5B:
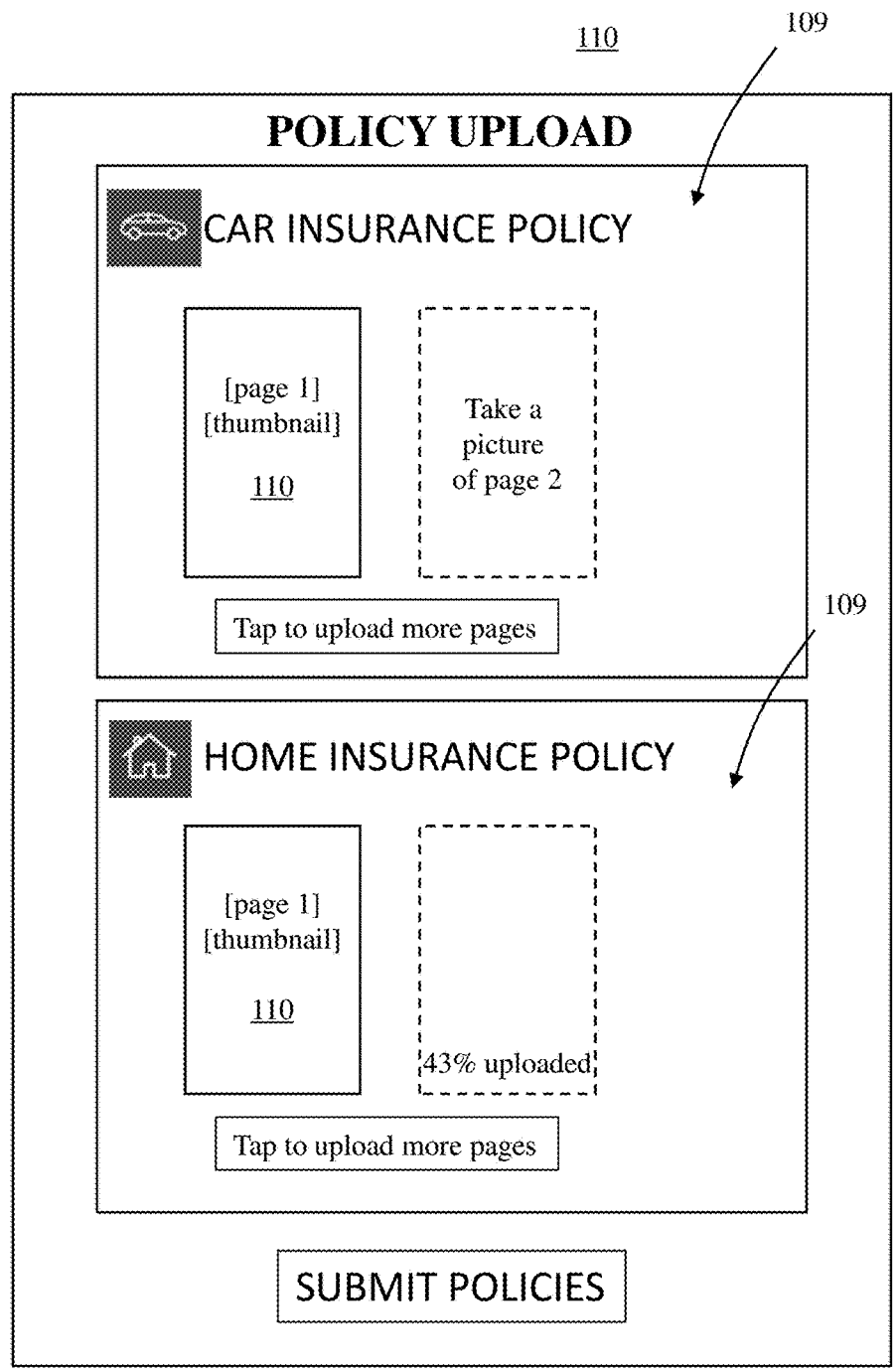
FIG. 5B is an exemplary screenshot illustrating a buyer uploading images of a policy declaration sheet in accordance with at least one embodiment of the present invention.

For example, in at least one embodiment, the buyer(s) 20 may take a photograph of one or more pages of the insurance policy, declaration sheets, or other representative information, e.g., with a mobile device or separate camera. Other methods may include scanning certain pages of an insurance policy or using an already obtained digital copy (e.g., in pdf form) of an insurance policy or portions thereof. Referring to FIG. 5B, for example, an exemplary screenshot is provided showing the process of uploading of various pages of a service agreement or insurance policy 109 to the system of the present invention. For instance, as the pages or images are uploaded, a thumbnail 110 may be provided. In some embodiments, the buyer(s) may be able to click on the thumbnail 110 and view a lager rendition of the uploaded document, image or media component, for example, to view the legibility and/or proper exposure. If desired, the buyer 20 can cancel or delete the image or component 106 and, if desired, upload a new one. In addition, the buyer(s) 20 may continue to upload multiple pages or submit the pages to the system. It should be noted that when uploading the images or media components, the buyer may choose to access a camera, a gallery (e.g., photo album) or file system (e.g., to browse to the file(s)).

Referring now to FIG. 3C, the method 300 of at least one embodiment of the present invention includes receiving a request from the buyer. The request may include an uploaded image, digital file or other media component, as provided above and represented as 302. Furthermore, the request may include additional personal or other information from the buyer, as represented as 304 or other details, descriptions, notes, etc. from the buyer 20. The additional information may be extracted from the buyer's 20 profile 101 or may be obtained by asking the buyer additional questions via the management processing system 40. As an example, the additional personal or other information may include name, address, phone number, email address, and/or answers to initial questions such as whether the buyer has received moving violations in the past, etc.

Furthermore, still referring to FIG. 3C, as represented at block 306, the method 300 of at least one embodiment also includes processing the image, photograph, digital file or other media component and associating the media component to the buyer's profile or account. For instance, processing the uploaded media or digital file may be conducted automatically by the system 10 and method 300 and/or manually, for instance, by a person reviewing the uploaded media. Either way, processing the media may include digitally enhancing the media, extracting detailed insurance policy information from the media, redacting the media, etc.

As an example, the system 10 may include an image processing module 45 which may automatically process the uploaded media and/or may be operable to process the media at the direction or instruction from a user. For example, the image processing module 45 may include various hardware and/or software components that function to receive the media and include capabilities of enhancing the media, extracting information from the media, redacting the media, etc. In particular, the image processing module 45 may automatically enhance the media by applying filters, changing the brightness, contrast, or other features of the media. In the case of manual processing, the image processing module 45 may include an application, program or software package that allows a user or person to manually enhance the media, for example, by manually selecting filters, manually adjusting the colors, contrast, brightness, etc. In such a case, the image processing module 45 may include a photo or image editing program, software, application or package.

In addition, as provided above, processing the media, whether automatically or manually, may also or instead include extracting information or details from the media that may be important or beneficial to the bidding or quotation process described herein. For example, some information that may be extracted from the media may include, but is in no way limited to, identification of items (e.g., vehicles, homes) covered, premium amount(s), discounts applied, coverage details (e.g., policy or coverage limits, deductible amount(s), and premium and premium amount(s)), policy identification numbers or accounts, effective date(s), identification of the insured, identification of an insurance agent and/or agency, etc. In the case of automatic processing by the system 10 or method 300, the image processing module 45 may include optical character recognition (OCR) capabilities to automatically scan, read and/or interpret the contents of the document.

In some embodiments, the system 10 and/or method 300, and in particular, the image processing module 45 thereof may be configured to automatically locate, identify and/or read (e.g., via OCR) the various components or details of the policy, document or media. For instance, it is possible that policy documents (e.g., insurance declaration sheets) for different insurance agencies (e.g., State Farm, Farmers, All State, etc.) or even different agents may provide the detailed information (e.g., policy limits, premiums, etc.) in different locations on the document. Thus, in one embodiment, the system or method may be configured to identify the insurance agency (e.g., State Farm), then, knowing where the detailed information is usually located for State Farm declaration sheets, identify the detailed information in those locations via OCR. Other embodiments may be configured to process the document (regardless of what agency is involved) and identify the various detailed information (e.g., policy limits, premiums, etc.) based on the content of the document itself.

Other embodiments may allow for manual processing or extracting of the information such that a person may receive the uploaded document or file, and manually extract the information (e.g., policy limits, premiums, etc.) therefrom. The information extracted from the media, whether manually or automatically, may then be entered into a database or other storage component for subsequent retrieval and disclosure to one or more seller(s) 30, as described herein.

Furthermore, in some embodiments, the system 10 and/or method 300, and in particular, the image processing module 45 thereof, may be configured to automatically locate, identify and/or redact one or more details of the policy, document or media. For instance, the image processing module 45 may automatically locate certain predefined portions of the media (e.g., policy limits, premiums, contact information, personal information, etc.) and redact those details from the media. Redaction may include overlaying a black or dark line, block or other mark over the details such that the details cannot be read or identified. Other redaction methods may include blurring, distorting, or removing the details from the media.

Other embodiments may allow for manual processing or redacting of the information such that a live person may receive the uploaded document, and manually redact the information (e.g., policy limits, premiums, etc.)

Referring again to the method 300 of FIG. 3C, as shown at block 310, limited lead information 120 pertaining to the request may then be made available to one or more seller accounts. For example, the limited lead information 120 initially provided to the one or more sellers 30 or agents may include the type of insurance or service requested 122 (e.g., automobile insurance, home insurance, motorcycle insurance, renter insurance, etc.), the buyer's name, the buyer's location, the date the request was submitted, the estimated start date of the policy, and/or an approximate policy value 124. The approximate policy value 124 may be based upon or calculated by the coverage amounts, premium amounts, etc. For instance, in at least one embodiment, the approximate policy value 124 may include the premium amount(s) 404 extracted or otherwise obtained from the file or media provided by the buyer as part of the request. The approximate policy value 124 may be identified as the total premium(s) of the previous or current policy if paid in full, if paid in installments, including discounts, not including discounts, etc. In particular, many insurance policies include a premium amount that can be paid in full (e.g., one-time payment). This amount, in one embodiment, may be the approximate policy value 124. Many premiums may be paid in installments (e.g., monthly, quarterly, or other periodic installments), and is oftentimes greater than the premium if paid in full. Some embodiments may use this number or amount as the approximate policy value 124. Furthermore, oftentimes discounts may be applied toward the premium or amount paid by the insured (e.g., safe driving discounts, responsible payer discounts, homeowner discounts, safety-based discounts, etc.). In some embodiments, the approximate policy value may include the applied discounts, whereas in other embodiments, the approximate policy value may not include the discounts. It should also be noted that in some embodiments the approximate policy value is taken directly from the digital file (e.g., premium amount), whereas, in other embodiments, the system or method may use the premium amount, discounts, or other amounts obtained by the digital file or media element in order to calculate, estimate, or otherwise determine the approximate policy value 124.

Moreover, in some embodiments, the approximate policy value 124 is calculated or determined by an administrator of the system 40 and manually inserted, although it is contemplated that the system or method can process the digital image and automatically determine the approximate value based thereon. In other embodiments, the approximate value may be provided by the buyer.

For instance, the limited information 120 provided to the seller(s) may be some of the information extracted from the digital file or media component uploaded by the buyer 20 and/or based upon or calculated from the digital file or media component uploaded by the buyer 20. Particularly, the limited information 120 may include the approximate policy value 124. In many cases, the seller will attempt to lower or match the approximate policy value 124 with the subsequent bid or quote, as provided herein. In some embodiments, the limited information 120 may include a thumbnail 126 or full image, file or rendition of the redacted digital file provided by or uploaded by the buyer 20. Specifically, the redacted file or image may only reveal limited information 120 pertaining to the request or insurance policy, such as the type of policy or insurance requested and/or approximate policy value 124. Other information, including personal contact information for the buyer(s) 20 may be redacted or otherwise unreadable in the limited information phase of the method 300.

For instance, referring now to the high level seller flow chart 200 of FIG. 3B, as shown at block 202, the seller 30 may begin by creating an account or profile or by logging into the system 40 via a previously created account. As an example, the seller account or profile may include certain personal information or contact information, such as the seller's 20 name, email address, phone number, zip code or other location parameter (e.g., city, county, state, etc.) password, etc. As provided above, the seller or agent profile may also include an identification or description of the insurance agency or company with which the seller or agent represents or is affiliated.

Figure 5C:
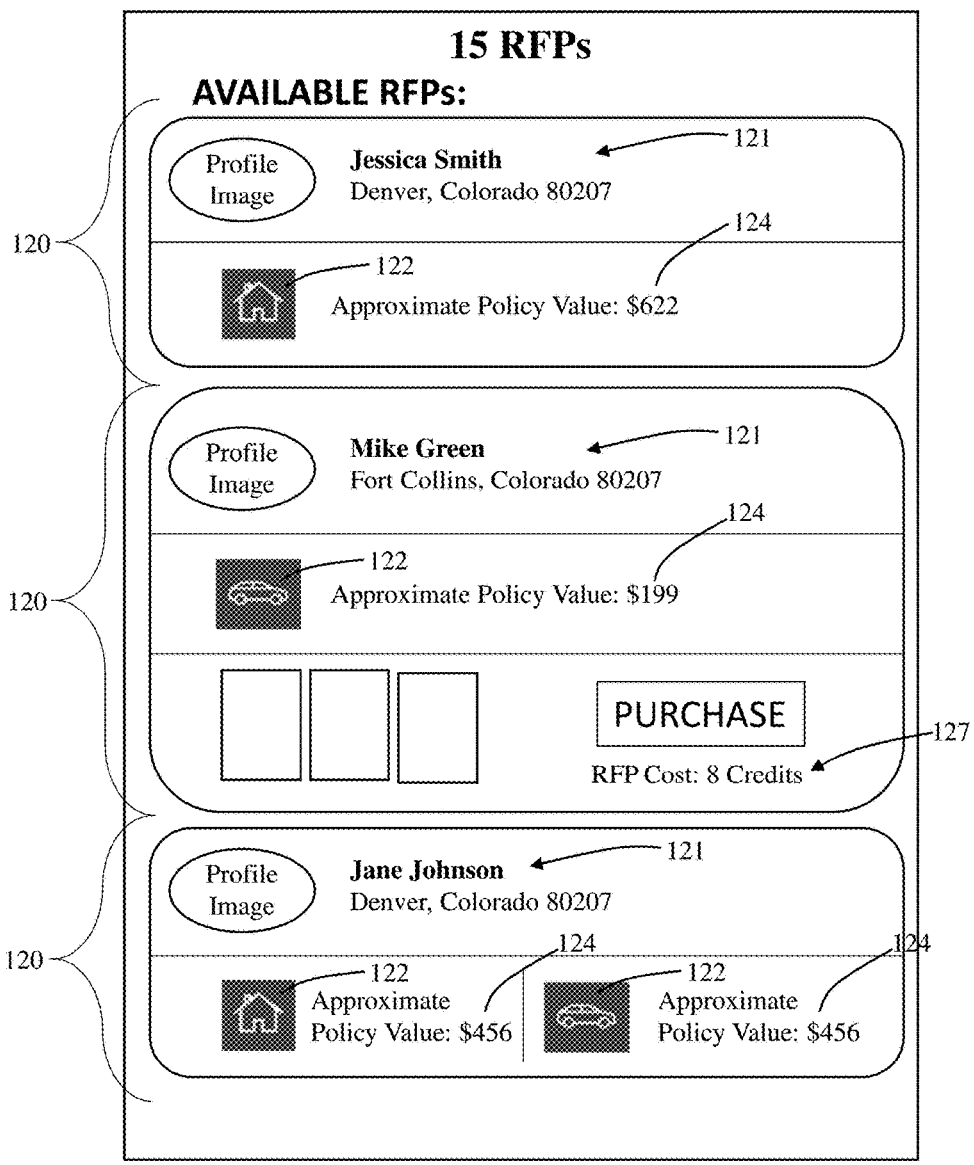
FIG. 5C is an exemplary screenshot illustrating a seller's view of limited lead information corresponding to a plurality of requests for proposals as disclosed in accordance with at least one embodiment of the present invention.

Once the seller 30 has logged into the system 40 or otherwise accessed the system 40, the seller 30 may then view or otherwise access limited lead information pertaining to a plurality of requests, as generally shown at block 204 in FIG. 3B. For example, FIG. 5C shows an exemplary screenshot of a list or display of limited lead information 120 pertaining to a plurality of requests. As shown, the limited lead information 120 of at least one embodiment includes the name and location of the buyer 121, the type of insurance or service requested 122 (e.g., via a graphical icon, although other icons, descriptions or text may be used), and an approximate value of the policy 124. As provided, certain embodiments may also display a redacted version of the digital file 126 uploaded by the buyer 20.

In certain embodiments, the system 10 and/or method 300 further includes a distribution module 47 such as an algorithm, software or hardware component that is structured to distribute or display certain requests or limited lead information 120 to certain seller/agent accounts or profiles. For instance, in at least one embodiment, not all of the sellers 30 may be able to view all of the requests submitted by buyers 20. In one embodiment, the distribution module 47 may be structured and configured to display or provide the limited lead information 120 or request to sellers/agents 30 that are within a prescribed geographical area, or within a geographical area that corresponds to the buyer 20. For example, the geographical area that corresponds to the buyer may be defined by a location parameter (e.g., city, state, zip code, county, etc.) identified in the buyer's profile or specified as part of the request submitted by the buyer 20. Particularly, in some embodiments, the geographical area may include the location parameter or may be calculated using the location parameter. Specifically, if the location parameter is a zip code, the geographical area may be defined as that zip code, or the zip code plus 5, 10, 15, 20 miles beyond or around that zip code.

Similarly, each of the sellers may be associated with a geographical area, for example, defined by or calculated using a location parameter provided in the seller's account or profile. Other embodiments may define the seller's geographical area by a location parameter assigned by the system or an administrator of the system, such that the seller cannot easily change the location parameter and circumvent the spirit of the distribution module 47 of the present invention.

In any event, the distribution algorithm 47 of at least one embodiment is structured and configured to only provide the request(s) or limited lead information 120 pertaining to the request(s) to seller(s) who are assigned or otherwise include a geographical area that corresponds to or falls within the buyer's geographical area. This is aimed to prevent or minimize agents or sellers from other districts or other locations from obtaining request or leads outside of their assigned geographical area.

Furthermore, it is contemplated that more than one seller or agent may represent the same insurance agency (or service provider) within the same or overlapping geographical area. In some embodiments of the present invention, however, the system 10 and method 300 are structured to prevent, minimize or limit duplicate bids from sellers representing the same insurance agency. For instance, at least one embodiment of the distribution module 47 is structured to limit, prevent o minimize multiple bids from different agents of the same insurance agency on the same request (sometimes with different quotes or pricing).

Accordingly, in one embodiment, if more than a defined number of seller accounts include a location parameter within or overlapping the same geographical area of the request and those seller accounts are associated with the same insurance agency or company, then the distribution module 47 may be configured to only display or provide the limited lead information 120 to a subset of those seller accounts. For example, the defined number of seller accounts may be two or more, and the subset may be defined as one, although other numbers may be contemplated. Thus, in one embodiment, only one of the seller accounts representing a common insurance agency within the geographical area of the request may view the limited lead information. The other seller accounts may not even see the limited lead information 120 for that request when they log in.

In order to determine which seller account to provide the limited lead information 120 to, the system 10 or method 300 may process seller ratings, as provided herein. For instance, sellers may be rated or reviewed by buyers, administrators, or other users of the system 10 or method 300. Therefore, in one embodiment, the seller with the highest rating in the group of sellers who share a common agency and geographical area may be provided the limited lead information 120. Other filtering or determining algorithms may be contemplated, such as, for example, based upon seller loyalty, the number of bids or purchases the seller has previously made, the number of bids or purchases the seller is contractually obligated to make, etc. For example, the seller(s) may enter into an agreement with the system agreeing to purchase X number of leads or to submit Y number of bids. Those sellers with the highest purchase or bid obligations may be provided the limited lead information 120.

In yet another embodiment, in the event there are more than one (or other defined number) of sellers within or overlapping a geographical area corresponding to the buyer or request and which represent a common agency, the system 10 and method 300 may provide the limited lead information 120 to all of the sellers, although only accept a bid or lead purchase from one (or other defined number or subset). For instance, in some embodiments, the system 10 or method 300 may only accept the first lead purchase or first bid from sellers in the same geographic area representing the same agency.

Referring again to the flow chart of FIG. 3C, the method 300 may further include assigning a purchase amount or transaction amount for the request submitted by the buyer, represented in block 308. For instance, in order for the seller 30 to view additional lead information pertaining to the request, or otherwise information beyond the limited lead information 120, the seller must purchase the lead. The purchase may be consummated with the exchange of money, credits or other form of currency, for example. In any event, in some embodiments, the amount 127 required for the purchase may be equal for all requests, may be determined based upon the location of the request (or location of the buyer), may be determined based upon the seller's credentials, or any combination thereof. Other determining factors for assigning a purchase amount 127 for the request may include the approximate value of the requested service or policy or the type of policy or service requested. For example, the price to purchase a lead for automobile insurance may be less than the price to purchase a lead for home insurance. Similarly, the price to purchase a lead for a policy (of any type) with an approximate value of $199 may be less than the price to purchase a lead for a policy (of any type) with an approximate value of $999.

Moreover, and still referring to FIG. 3C, the method 300 further includes receiving a lead purchase for a request or RFP, as generally shown at block 312. For example, a seller or agent may decide to purchase a lead by submitting the assigned amount 127. Once the system 10 or method 300 has received the purchase or otherwise completed the transaction for the lead purchase, additional lead information or details are then released to the seller, as shown at 314 in FIG. 3C.

Particularly, the additional lead information or details may include, for example, the raw, unredacted image or digital file uploaded by the buyer. As described above, the digital file provided by or uploaded by the buyer may include a policy declaration sheet or other document(s) that include details corresponding to an existing or prior policy or agreement. While some embodiments will release or unlock the full, unredacted image(s) or file(s), at least one embodiment may retain some redactions in order protect the privacy of the buyer, for example.

In other embodiments, upon consummating the lead purchase, the system 10 or method 300 may provide the additional lead details in the form of text, a list, email, text message, etc., rather than or in addition to releasing or providing the image(s) or digital file(s) provided by or uploaded by the buyer 20.

Figure 5D:
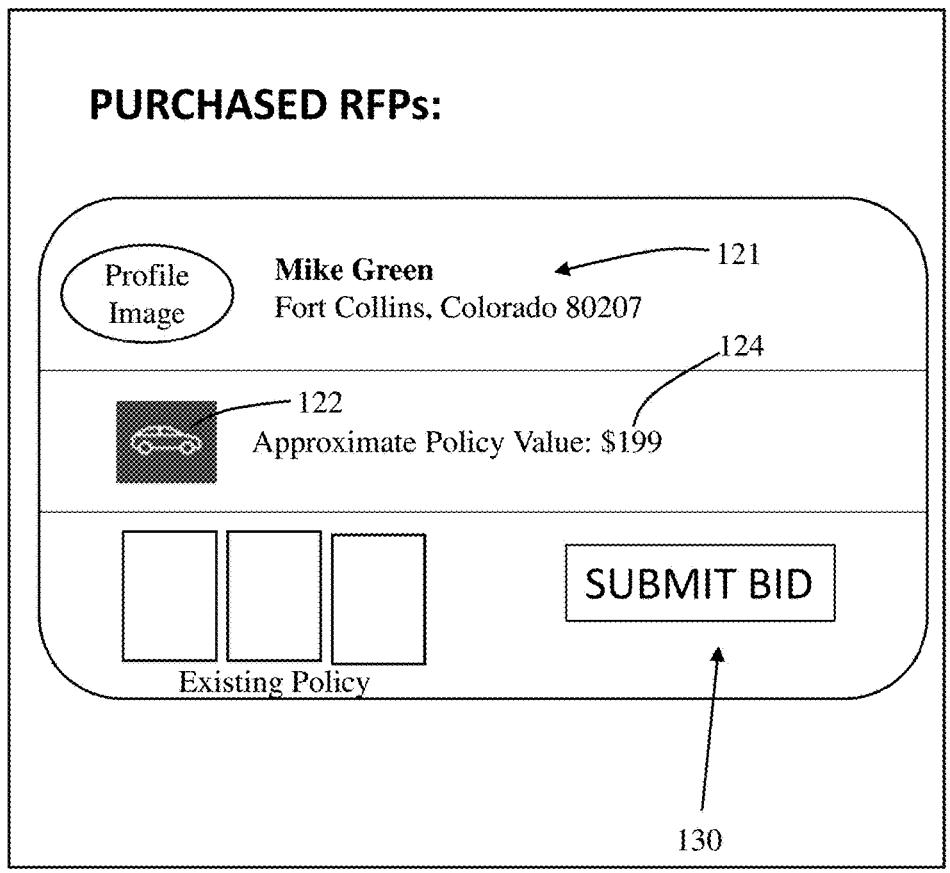
FIG. 5D is an exemplary screenshot illustrating a seller's view of purchased leads allowing for submission of a bid as disclosed in accordance with at least one embodiment of the present invention.

Furthermore, as shown at 316 in FIG. 3C and 130 in FIG. 5D, the method 300 further includes receiving submitted pricing, quote(s), or bid(s) relative to the request and presenting that bid to the buyer. For instance, once the lead has been purchased, the seller or agent 30 may decide to submit a bid on the request. The bid may include a precise or estimated quote for the services requested, e.g., the insurance policy requested. The bid may also include a number of different quotes or different bids for related services, for example, quotes or bids for a variety of policies with similar or modified terms.

Figure 5E:
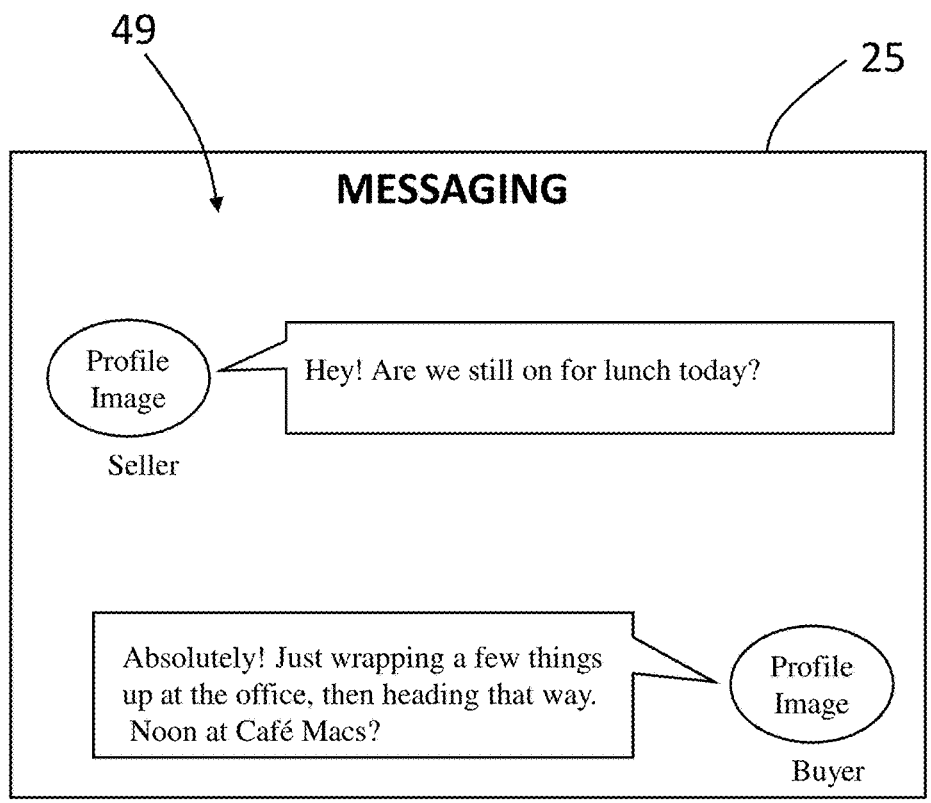
FIG. 5E is an exemplary screenshot illustrating the messaging module as disclosed in accordance with at least one embodiment of the present invention.

Furthermore, as shown in the exemplary screenshot of FIG. 5E, in certain embodiments of the present invention, a messaging module 49 is included which allows the buyer(s) and seller(s) to communicate directly with one another via the system 10 and method 300. The messaging module 49 may be initially locked or unavailable, at least to the sellers, unless and until a lead purchase or a bid is submitted. For example, in one embodiment, upon purchasing a lead, the seller may access the messaging module 49 and communicate directly to the buyer(s). In other embodiments, the messaging module 49 may not be unlocked or available until a bid is placed on the request, as shown at 318 in FIG. 3C.

It should also be noted that in some embodiment, upon submitting a lead purchase and/or bid, the system 10 and/or method 300 may release the buyer's contact information (e.g., phone number, email address, mailing address, etc.) to the corresponding seller in order to allow communication there between outside of the system 10.

Figure 5F:
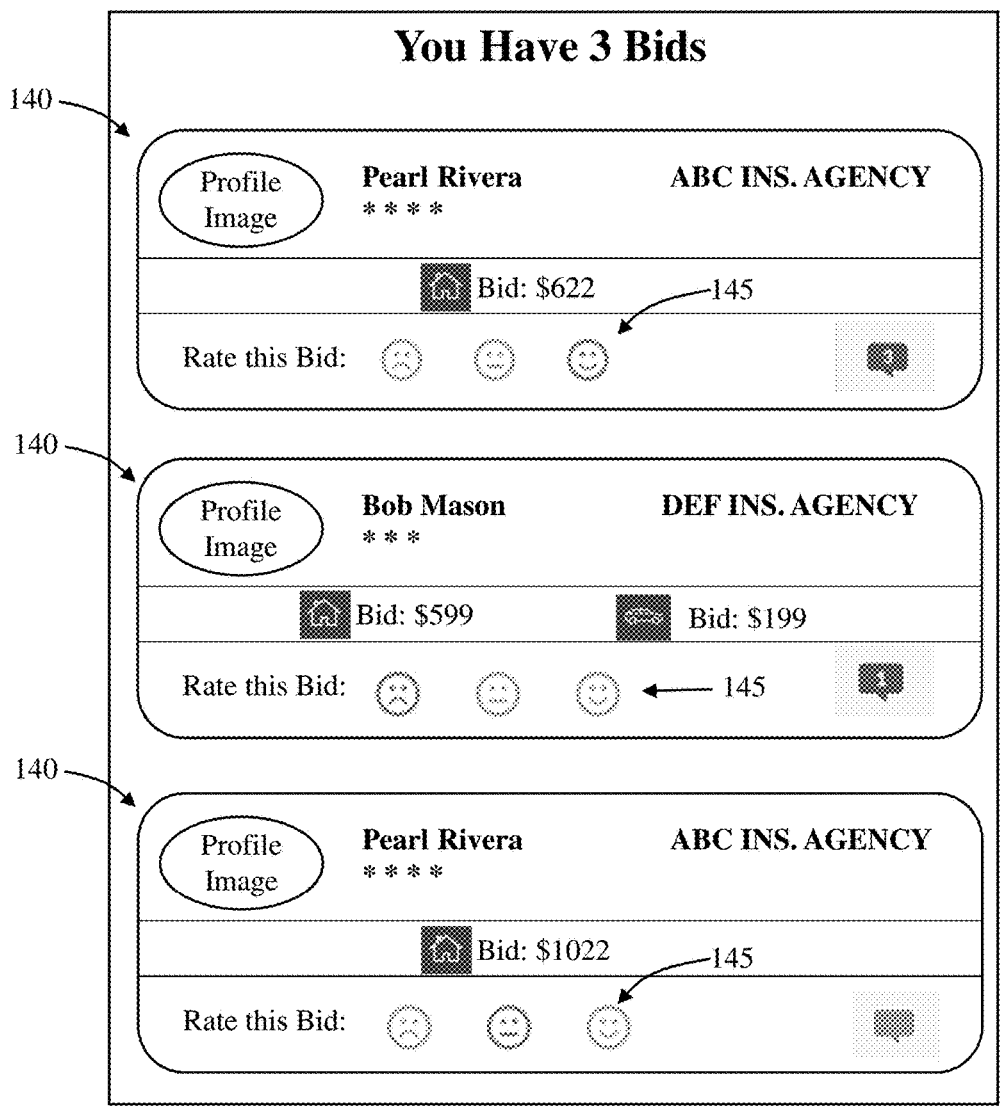
FIG. 5F is an exemplary embodiment illustrating the buyer's view of bids submitted in response to a request for proposal as disclosed in accordance with at least one embodiment of the present invention.

Referring to the exemplary screenshot of FIG. 5F, the buyer may be able to view a plurality of bids 140 that have been submitted in response to his or her insurance quotation request. The buyer may rate 145 each of the requests (e.g., in the form of happy, neutral or unhappy, as shown, or other ratings). This can be used to change the display order of the bids. In some embodiments, the sellers will be notified of the rating, whereas in other embodiments, the seller will not know. As shown at 147, the buyer may also be able to activate or open the messaging module to message directly with the corresponding seller.

Furthermore, additional features of at least one embodiment of the present invention include a seller rating system in order for the buyer(s) to rate the sellers (not just the precise bids that were submitted). For example, in one implementation, a message (e.g., email) may be communicated to the buyer after the buyer submits a request or after one or more sellers submits bids on the request. The buyer will be asked to rate the seller based upon the promptness, pricing, how close the bid was to the final price, friendliness and overall satisfaction. This rating may be used by the system or method in order to select which sellers have access to subsequent requests, for example, via the distribution module 47 described herein.

In addition, further features may include the ability for one or more sellers to limit the number of subsequent bids that can be placed on a request. For example, when a seller places a bid on a request, in at least one embodiment, the seller may be able to submit further payment to the system in order to limit other subsequent bids from other sellers. Particularly, a seller who bids on a request may purchase the ability for the system to prevent, restrict or minimize others from bidding within a timeframe (e.g., 1 hour, 12 hours, 1 day, 1 week, etc). Other embodiments may allow for the seller to purchase the ability for the system or method to increase the lead purchase price for subsequent sellers.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A network-based insurance proposal communication method, comprising:

receiving an insurance quotation request at a management processing system from a buyer device via a communication network, the management processing system comprising a computer processor, memory and a storage device, the insurance quotation request comprising at least one media component comprising information corresponding to at least a portion of an existing or prior insurance policy, defining the at least one media component as comprising a digital image of an insurance declaration sheet, processing the at least one media component and associating the at least one media component to a buyer account, wherein processing the at least one media component comprises digitally enhancing the digital image, and extracting insurance policy information therefrom, providing limited lead information corresponding to the insurance quotation request to at least one seller account, and upon receiving a lead purchase corresponding to the insurance quotation request from the at least one seller account, releasing additional lead information corresponding to the insurance quotation request to the at least one seller account.

2. The method as recited in claim 1 wherein processing the at least one media component comprises redacting insurance policy information thereon.

3. The method as recited in claim 1 wherein providing limited lead information is conducted in accordance with a pre-defined distribution processor for selecting the at least one seller account.

4. The method as recited in claim 1 wherein releasing additional lead information comprises providing the digital image to the at least one seller account.

5. The method as recited in claim 1 further comprising upon receiving an insurance quotation from the at least one seller account, allowing communication between the buyer account and the at least one seller account via the management processing system.

6. The method as recited in claim 1 further comprising upon receiving an insurance quotation from the at least one seller account corresponding to the insurance quotation request, releasing contact information corresponding to the buyer account to the at least one seller account.

* * * * *